United States Patent [19]

Maki et al.

[11] 3,949,014

[45] Apr. 6, 1976

[54] BINDER

[75] Inventors: Tatsuo Maki, Hirakata; Setsuo Hori, Kyoto; Yuji Sakamoto; Minoru Yoshimoto, both of Hirakata; Tsuneo Manabe, Takatsuki, all of Japan

[73] Assignee: Showa High Polymer Co., Ltd., Japan

[22] Filed: Apr. 10, 1974

[21] Appl. No.: 459,850

[52] U.S. Cl.... 260/836; 260/29.2 EP; 260/29.6 NR; 260/823; 260/874; 260/901; 428/378; 428/394; 428/414
[51] Int. Cl.$^2$.......................................... C08L 63/00
[58] Field of Search .......... 260/836, 29.2 EP, 29.6 NR, 260/874, 901

[56] References Cited
UNITED STATES PATENTS

| | | |
|---|---|---|
| 3,062,686 | 11/1962 | Graulich..................... 260/29.6 NR |
| 3,321,432 | 5/1967 | Strasser...................... 260/29.6 NR |
| 3,338,858 | 8/1967 | Strasser............................... 260/836 |
| 3,660,338 | 5/1972 | Economou .................. 260/29.6 NR |
| 3,686,109 | 8/1972 | Aldrich ....................... 260/29.6 NR |
| 3,816,556 | 6/1974 | Coscia ............................... 260/836 |

*Primary Examiner*—Paul Lieberman
*Attorney, Agent, or Firm*—Wenderoth, Lind & Ponack

[57] ABSTRACT

This invention relates to a binder comprising (a) a polyamine-epichlorhydrine resin obtained by reacting epichlorhydrine with a polyamine resin having at least 2 amino groups per molecule; and (b) an amphoteric high molecular compound having at least 2 cation groups and at least 2 anion groups per molecule.

6 Claims, No Drawings

BINDER

DETAILED EXPLANATION OF INVENTION

This invention relates to a binder comprising (a) a polyamine-epichlorhydrine resin obtained by reacting epichlorhydrine with a polyamine resin having at least two amino groups per molecule; and (b) an amphoteric high molecular compound having at least two cation groups and at least two anion groups per molecule. A combination of the resins (a) and (b) remarkably improves the thermosetting properties of the polyamine-epichlorhydrine resin and the strength of paper in the wet state. The combination of the resins (a) and (b) further improves aggregate structures in soil, which improvement has not been effected heretofore by the sole use of the polyamine-epichlorhydrine resin. The binder of this invention is also effective as a binder for rockwool and non-woven cloth, and is useful for treating a fabric. The binder of this invention is further effective in improving the bonding strength and waterproofing property of a bonding agent when it is used in combination with said bonding agent.

Heretofore, the polyamine-epichlorhydrine resin was developed as a reinforcement to improve the strength of paper in the wet state. Recently it has been recognized as being useful, and the amount consumed has been increasing. Polyamine-epichlorhydrine has many cationically active parts based on primary, secondary or tertiary amino groups and/or quarternary ammonium groups in its molecule, and also has an epoxide group and a chlorhydrine group derived from epichlorhydrine. The strength of paper in the wet state is improved by the function of these cationically active groups, the epoxide group and the chlorhydrine group. Then, the improvement of the polyamine-epichlorhydrine resin has been studied from various points of view, but most of the study has been directed to the improvement and development of the polyamine.

The improvement of the polyamine-epichlorhydrine resin of our invention is characterized by using an amphoteric high molecular compound in combination with the polyamine-epichlorhydrine resin.

When a polyamine-epichlorhydrine resin is contacted with an amphoteric high molecular compound in a water medium, the two resins firmly bond to each other. This is probably because cation groups of the polyamine-epichlorhydrine resin electrostatically bond with anion groups of the amphoteric high molecular compound. Then, epoxide groups or chlorhydrine groups in the polyamine-epichlorhydrine resin are reacted with amino groups in the amphoteric high molecular compound to form a cross linkage between the two different molecules. The structure of this cross linkage between the two different molecules is different from that of the cross linkage between the same molecules obtained by the conventional cross linking reaction of polyamine-epichlorhydrine resins alone.

The difference between the above two types of cross linkages makes the binder of this invention useful. The various effects achieved by the use of the binder of this invention result from this cross linkage between the different molecules.

The strength of paper reinforced by a binder comprising the polyamine-epichlorhydrine resin and the amphoteric high molecular compound as in this invention is increased 20 – 100% in both dry and wet states in comparison with that of paper reinforced by the polyamine-epichlorhydrine resin alone.

Various soil-improving agents which facilitate the preparation of aggregate structures suitable for plant growth have been developed and have been commercially available heretofore. The properties of these soil-improving agents are that they are (a) water soluble; (b) high molecular compounds and (c) straight chained. There are both anion and non-ion types, but many of them are anion type. The preparation of aggregate structures in soil by the conventional soil-improving agent is effected by chemical secondary bondings such as ionic bonds, hydrogen bonds, hydrophobic bonds, Van der Waals' forces and the like. The bonding force of all these chemical secondary bondings is weak, and therefore the durability of the aggregate structures prepared by using the conventional soil-improving agents is weak. This is the fundamental defect of the conventional soil-improving agents.

We have found that the durability of aggregate structures of soil is remarkably improved by using the binder of this invention in combination with the conventional soil-improving agents. This is probably because the aggregate structures in soil are protected by chemical primary bonding made by the binder of this invention. These aggregate structures are first prepared by treating soil with the conventional soil-improving agent and a polyamine-epichlorhydrine resin, and then the aggregates of soil are treated with an amphoteric high molecular compound whereby cation groups of the polyamine-epichlorhydrine resin are electrostatically bonded with anion groups of the amphoteric high molecular compound. Thereafter, epoxide groups or chlorhydrine groups of the polyamine-epichlorhydrine resin are reacted with amino groups of the amphoteric high molecular compound at a normal temperature and even in a water medium to form a cross linkage structure which strengthens the durability of aggregate structures in soil.

Rockwool plate useful as a building material or non-woven cloth is prepared in accordance with a "wet process" by dispersing rockwool or fibers for preparing non-woven cloth in water, adding a suitable binder to the resultant suspension to fix the binder on the surface of the rockwool or fibers thereby forming a wet plate or cloth, and drying the resultant wet plate or cloth. It is generally difficult to fix a binder on the surface of the rockwool or fibers (mainly synthetic fibers) for preparing non-woven cloth through the use of a chemical fixer since the surface of the rockwool or the fibers is chemically stable. Accordingly, in the conventional process the binder is physically fixed. Many binders used for preparing a rockwool plate or non-woven cloth are anion type, and these binders are formed into a large cohering mass by the use of cohesive agents such as aluminum sulfate, a polycation resin and the like, then fixed physically. We have found that, in the preparation of this rockwool and non-woven cloth, a combination of a polyamine-epichlorhydrine resin and an amphoteric high molecular compound is very useful for physically fixing the above mentioned anion type binders. That is, in the preparation of this rockwool and non-woven cloth, an anion type binder is cohered by the addition of the polyamine-epichlorhydrine resin, and when the amphoteric high molecular compound is added, a cation group of the polyamine-epichlorhydrine resin is electrochemically bonded with an anion group of the amphoteric high molecular compound to form a larger cohering mass which can be more easily fixed on the fibers. In the process for drying a wet plate of rockwool or non-woven cloth, epoxide groups or chlorhydrine groups of the polyamine-epichlorhydrine resin in the above prepared binder-polyamine-epichlorhydrine resin-amphoteric high molecular compound complex are reacted with amino groups of the amphoteric high molecular compound in the same complex to form a cross linking structure, thereby producing a rockwool plate or non-woven cloth which is improved in strength, water-proofing and durability in comparison with those prepared by the conventional method.

Bonding agents used in preparing building materials such as ply-wood, particle board and the like include vinylacetate-acrylic acid ester copolymers, polyacrylic acid esters, polyvinylacetate-type, urea-type, melamine-type, phenol-type, rubber-type compounds and the like. When water-proofing is required, a urea-type, melamine-type or phenol-type bonding agent is generally used alone or in combination with other bonding agents. However, recently, the use of such bonding agents has been restricted from the point of constituting a public nuisance since they contain formalin. We have found that both the bonding strength and water-proofing of a bonding agent are improved by using a polyamine-epichlorhydrine resin and an amphoteric high molecular compound in combination with other bonding agents, and that this bonding system does not produce formalin. The quality of this bonding system is no poorer than that of the urea-type, melamine-type and phenol-type bonding agents.

In order to improve the chemical and physical properties of a fabric, it is generally treated with a resin. We have found that the feel, bulkiness, shrinkage resistance and crease resistance of a fabric are remarkably improved by using a polyamine-epichlorhydrine resin and an amphoteric high molecular compound in combination with other treating agents.

The polyamine-epichlorhydrine resin used in this invention is a water-soluble cationic resin obtained by the reaction of polyamine and epichlorhydrine, which is curable into a three-dimensional structure in the presence of heat.

The polyamine used in this invention includes (I) polyethylene-imines, polyalkylene-polyamines, and the like; (II) polyamide-polyamines obtained by reacting an alkylenediamine, polyalkylenepolyamine or the like with a saturated or unsaturated dibasic carboxylic acid or it ester; (III) polyamide-polyamines obtained by the reaction of three components, an alkylenediamine, epichlorhydrine and a saturated or unsaturated dibasic carboxylic acid or its ester; (IV) derivatives prepared by modifying polyamide-polyamines of (II) or (III), i.e. urea-modified polyamidepolyamines, ethyleneoxide-modified polyamidepolyamines, formalin-modified polyamidepolyamines, vinyl compound-added polyamide-polyamines and the like; (V) polyamide-polyamines of (II) in which 3 – 70% of the polyalkylenepolyamine and the saturated or unsaturated dibasic carboxylic acid or its ester are replaced by $\epsilon$-caprolactam or urea; (VI) acrylamide-vinylamine copolymers and (VII) amino derivatives obtained by modifying polyacrylamide, an acrylamide-acrylic acid ester copolymer or the like with formalin and various amines (alkylamines, alkylenediamines, polyalkylenepolyamines or the like).

In the reaction of epichlorhydrine and the polyamine, the epichlorhydrine is used in an amount of 0.5 to 2.5 equivalents per amino functional group of the polyamine.

The amphoteric high molecular compound used in this invention is a water-soluble high molecular compound having at least two, preferably at least 10 anion and cation groups respectively in a molecule. The anion group includes carboxyl groups and sulfone groups, and the cation group includes primary, secondary and tertiary groups as well as quarternary ammonium groups. However, it is essential that one primary, secondary or tertiary amino group must be included as a cation group. The amphoteric high molecular compound used in this invention has a molecular weight of $10^2 - 10^7$, preferably $10^3 - 5 \times 10^6$.

Examples of the amphoteric high molecular compound include aminocarboxylic acid derivatives of polyacrylamide; an acrylic acid ester-acrylic acid copolymer modified by an amino group-containing compound (e.g. an alkylamine, alkylenediamine, polyalkylenepolyamine or the like); an acrylamide-polymerizable monobasic or dibasic acid-dimethylaminoethylmethacrylate copolymer; a polymerizable monobasic or dibasic acid-dialkylaminoethylmethacrylate copolymer; a vinylamine-acrylamide-acrylic acid copolymer; a polyethylene-imine containing a carboxyl group; aminosulfonic acid derivatives of polyacrylamide; and the like.

The polyamine-epichlorhydrine resin is mixed with the amphoteric high molecular compound in a weight ratio of 99 – 20 : 1 – 80, preferably 97 – 40 : 3 – 60.

In reinforcing the strength of paper in both dry and wet states, the binder comprising the polyamine-epichlorhydrine resin and the amphoteric high molecular compound of this invention can be applied to the paper by any wet-end additive method, dipping method or spraying method. The binder of this invention is used in an amount of 0.1 to 10%, preferably 0.3 to 7% by weight of fiber. However, generally, the more of the binder used the more effective its action becomes. According to the wet-end additive method, a good result is generally achieved when the polyamine-epichlorhydrine resin is first applied to the fibrous material and then the amphoteric high molecular compound is applied to the resultant fibrous material with the polyamine-epichlorhydrine resin fixed.

In manufacturing paper containing white pigment such as titanium oxide, calcium carbonate, clay and the like or other colored pigments, a fixing ratio (or yield) of pigment used is an important factor. That is, the amount of pigment fixed in a fibrous material should be as high as possible. Heretofore, alminium sulfate, a cationic resin or the like was used to raise the fixing ratio of pigment, but a satisfactory result could not be attained. We have found that the fixing ratio of pigment is remarkably improved by using a polyamine-epichlorhydrine resin and an amphoteric high molecular compound in combination. Generally, in manufacturing pigment-containing paper, pigment is used in an amount of 2 – 50% by weight of a fibrous matrix, and the fixing ratio of the pigment added is usually 40 – 60%. We have found that the fixing ratio of pigment is raised by 50 – 90% when the polyamine-epichlorhydrine and the amphoteric high molecular compound of this invention are used in amounts of 1 – 50% and 0.5 – 40% respectively by weight of pigment. A good result is obtained when the polyamine-epichlorhydrine is first dispersed in a mixture of water, fibrous matrix and pigment, and the amphoteric high molecular compound is then added to the resultant mixture.

When the binder comprising the polyamine-epichlorhydrine resin and the amphoteric high molecular compound of this invention is used to improve aggregate structures in soil, it is possible to use it alone, but it is preferable to use the conventional aggregate-forming agent at first to prepare initial aggregate structures. The conventional aggregate-forming agent includes polyacrylamide, acrylamide-acrylic acid copolymers, acrylamide-acrylic acid ester-acrylic acid copolymers, styrene-maleic anhydride copolymer, polyvinyl alcohol, polyethyleneoxide and the like. According to a preferable method of aggregation, the conventional aggregate-forming agent and the polyamine-epichlorhydrine resin are applied to the soil separately in any order to prepare initial aggregate structures, and then the amphoteric high molecular compound is applied to the resultant soil whereby the initial aggregates grow bigger and durable aggregates are formed by the action of cross-linkage between the polyamine-epichlorhydrine resin and the amphoteric high molecular compound. The conventional aggregate-forming agent, polyamine-epichlorhydrine resin and amphoteric high molecular compound are used respectively in amounts of 5 ppm – 10%, 2 ppm – 5% and 1 ppm – 5% by weight of soil.

In manufacturing a rock wool plate, the binder of this invention alone can be effectively used, but it is generally preferable to use the conventional binder in combination with the binder of this invention. The conventional binders which have been used heretofore in the preparation of a rockwool plate include various starches, polyacrylic acid ester resins, acrylamide-acrylic acid copolymers, melamine resins, urea resins, phenol resins, acrylic acid ester-styrene copolymers and the like. These conventional binders are used in an amount of 5 – 15% by weight of the rockwool matrix, and the binder of this invention is used in an amount of 0.1 – 5%.

The conventional rockwool plate employed as a building material has a bending strength of 20 – 30 kg/cm$^2$, and this plate is prepared by using tapioca starch, wheat starch, corn starch or the like as a binder in an amount of 5 – 10% by weight of the rockwool matrix; a polyacrylic acid ester resin, modified polyacrylamide, melamine resin, urea resin, phenol resin or the like in an amount of 0.5 – 2.0% as an additive to impart hardness and water-proofing to the plate; and an alkylketene dimer, rosin sizing agent, petroleum resin or the like in an amount of about 1% as an additive to impart water-repellancy. However, it is required to restrict the amount used of these organic additives to 5 – 8% by weight of the rockwool matrix in order to keep the resultant plate nonflammable.

We have found that the bending strength of a rockwool plate is raised by 10 – 50% and the hardness and water proofing are also improved when the binder comprising the polyamine-epichlorhydrine and the amphoteric high molecular compound of this invention is used in an amount of 0.1 – 3% in combination with such conventional additives. Moreover, nonflammability is remarkably improved, and the strength of the plate is maintained even when the amount of the organic binder is used in a lesser amount. In preparing a rockwool plate, a small amount of asbestos may be incorporated. Asbestos is helpful for raising the fixng ratio of a binder in a fibrous matrix and accordingly for strengthening the plate.

Generally, a rockwool plate is successfully prepared by first dispersing a predetermined amount of binders including starches and water repelling agents in a rockwool matrix or a rockwool-asbestos matrix, secondly dispersing a polyamine-epichlorhydrine resin in the resultant matrix, and finally adding an amphoteric high molecular compound.

The combination of the polyamine-epichlorhydrine resin and the amphoteric high molecular compound of this invention may be used as a bonding agent for preparing ply-wood, a decorative plate comprising ply-wood laminated with decoration paper, a decorative panel plate comprising ply-wood laminated with a panel, and the like. The binder of this invention alone can be effectively used, but it is generally preferable to use it in combination with conventional binders such as vinyl acetate resins, vinyl acetate-acrylic acid ester copolymers, vinyl acetate-maleic acid ester copolymers, vinyl acetate-fumaric acid ester copolymers, vinyl acetate-ethylene copolymers, wheat starch and the like. For the purpose of improving bonding strength, alkaline metals, complex compounds of rare-earth metals (for example complex compounds of rare-earth metals with zirconium carbonate, titanyl sulfate or the like), and chelating compounds may be incorporated. The vinyl acetate type resin polyamine-epichlorhydrine resin and amphoteric high molecular compound are effectively used in a solid weight ratio of 100 : 200 - 1 : 200 - 0.5, and generally a good result is obtained when the polyamine-epichlorhydrine resin is used in a larger amount than the amphoteric high molecular compound.

When the binder of this invention is used to treat a fabric, it can be effectively used alone, but it is generally preferable to use it in combination with the conventional treating agents such as urea resins, melamine resins, and other resins which react with cellulose. The fabrics to be treated in accordance with the present invention include cotton, regenerated cellulose, chemical fibers, synthetic fibers, wool, and the like. By treating a fabric with the binder of this invention, wash resistance, tear strength, wear resistance, shrinkage resistance, development of chalk marks, and bulkiness of the fabric are remarkably improved. In the treatment, a vinyl acetate type resin, acrylic acid ester type resin, synthetic rubber, high condensation methylol urea, and high condensation methylol melamine may optionally be employed in combination with the binder of this invention. A fabric may be treated according to a dipping method, spraying method, or other suitable methods. Generally, the fabric is treated in a predetermined order by using a few baths containing the respective resins individually or by using spraying means. With regard to the binder of this invention, the polyamine-epichlorhydrine is preferably used first, and thereafter the amphoteric high molecular compound is used.

When the binder comprising the polyamine-epichlorhydrine resin and the amphoteric high molecular compound of this invention is used for preparing nonwoven cloth, the binder of this invention alone may be effectively employed, but it is generally preferable to use it in combination with the conventional binders such as a synthetic binder including polyvinyl alcohol, a polyacrylamide type resin, polyvinyl acetate, a polyacrylic acid ester, a styrene-acrylic acid ester copolymer, and synthetic rubber. The binder of this invention is effectively used especially when a non-woven cloth is prepared in accordance with a "wet process". According to the "wet process", a non-woven cloth is prepared by dispersing fibrous materials in water, adding a binder to the fibrous materials dispersed in the water, fixing the binder on the fibrous materials, and subjecting the wet film thus formed to a dehydrating and drying step. In the "wet process", it is an important technique to efficiently fix the resins (binder) on the fibrous material. Heretofore, polycations or aluminium sulfate have been used as fixers, but none of these has achieved a satisfactory effect. We have found that the fixing ratio of resins and the strength of cloth are remarkably improved by using the binder of this invention in the following manner. First, the conventional anion type synthetic resin is added to fibrous materials dispersed in water, and then the polyamine-epichlorhydrine resin of this invention is added to the resultant mixture. The anion groups of the anion type synthetic resin are electrostatically bonded with the cation groups of the polyamine-epichlorhydrine resin to form a series of cohering masses. To these cohering masses is added the amphoteric high molecular compound of this invention, and consequently the anion groups of the amphoteric high molecular compound are electrostatically bonded with the cation groups of the polyamine-epichlorhydrine resin, thereby increasing the size of the cohering masses. These large cohering masses of resins are fixed between the fibrous materials. Thus, the fixing ratio of the resins is improved by the use of the binder of this invention. In a subsequent drying step, the polyamine-epichlorhydrine resin and the amphoteric high molecular compound are reacted to form cross linkages. This cross linkage structure imparts a strength to the cloth, which had not been expected in a cloth prepared by using the conventional synthetic resin binder alone.

This invention is illustrated by the following Examples.

EXAMPLE 1

A pulp slurry was prepared by using a bleached sulfate pulp of needle-leaf tree wood ground of the degree of Canadian Standard Freeness 400 cc.

A polyamine-epichlorhydrine resin was prepared in the following manner: First, diethylenetriamine (99.3 g) and adipic acid (133.7 g) were heated in water (69.9 g) with stirring to carry out a condensation reaction, and, while removing water formed in the condensation reaction, the reaction temperature was raised to 190°C and maintained for 1 hour. To the resultant product was added hot water (200 g) having a temperature of 70°C to obtain 50% of a polyamide aqueous solution (394.9 g). 68.3 g of the thus obtained polyamide aqueous solution was diluted with water (105.9 g), and epichlorhydrine (25.8 g) was added to the resultant solution at 60°–80°C with stirring. The reaction was stopped by cooling the reaction mass when the viscosity of the reaction product reached "D" on the Gardner-Holt Scale.

The above prepared polyamine-epichlorhydrine resin and an aminocarboxylic acid derivative of polyacrylamide (amphoteric high molecular compound: mean degree of polymerization of the polyacrylamide, $\overline{P} = 5 \times 10^5$; content of vinylamino group = 15%; content of carboxyl group = 29%) were employed as a binder for wet paper.

The above prepared pulp slurry was diluted to 0.5%, and it was used in an amount necessary to give a paper having a basis weight of 60 g/m². The polyamino-epichlorhydrine resin (0.08 – 1.2% by weight) (based on dry pulp weight, hereinafter the same) was added to the pulp slurry with stirring to fix it on the pulp fiber, and then (0.02 – 0.3%) of the amphoteric high molecular compound was added to the resultant mixture.

According to TAPPI Standard Method, the above prepared composition was pressed under a pressure of 3.5 kg/cm² for 5 minutes to form a paper, and the paper was air-dried. The air-dried paper was heated at 110°C for 10 minutes.

As comparative examples, a paper containing no binder and a paper containing the polyamine-epichlorhydrine resin alone in an amount of 0.1 – 1.5% were prepared in the same manner as above.

These three types of paper were subjected to a test for bursting strength and the results thereof are shown in Table 1.

TABLE 1

| polyamine-epichlorhydrine resin (%) | amphoteric high molecular compound (%) | basis weight (g/m²) | burst factor in dry state | burst factor in wet state |
|---|---|---|---|---|
| — | — | 59.2 | 5.23 | 0.16 |
| 0.1 | — | 60.5 | 6.11 | 0.67 |
| 0.5 | — | 60.1 | 6.55 | 1.81 |
| 1.0 | — | 59.7 | 6.77 | 2.51 |
| 1.5 | — | 59.9 | 7.03 | 2.89 |
| 0.08 | 0.02 | 60.3 | 6.27 | 0.77 |
| 0.4 | 0.1 | 60.1 | 6.78 | 2.52 |
| 0.8 | 0.2 | 58.9 | 7.35 | 4.44 |
| 1.2 | 0.3 | 59.5 | 8.40 | 5.35 |

EXAMPLE 2

A polyamine-epichlorhydrine resin was prepared in the following manner: First, ethylenediamine (77.9 g), water (66.1 g), epichlorhydrine (60.1 g), and adipic acid (82.4 g) were heated with stirring, and the reaction temperature was raised to 185°C and maintained for 1 hour while removing water formed in the condensation reaction. To the resultant product was added hot water (200 g) having a temperature of 80°C to obtain 50% polyamide aqueous solution (392.8 g). Sodium hydroxide (5.7 g), epichlorhydrine (41.1 g) and water (155.4 g) were added to 97.8 g of the above prepared polyamide aqueous solution at 60°–80°C with stirring, and the reaction was stopped by cooling the reaction mass when the viscosity of the reaction solution reached "C" on the Gardner-Holt Scale.

An amino group-introduced polymer obtained by reacting ethylenediamine (25 mol) with a copolymer ($P = 2.5 \times 10^3$) obtained by polymerizing acrylamide (80 mol) methyl acrylate (15 mol) and acrylic acid (5 mol) was employed as an amphoteric high molecular compound.

By using the same pulp slurry and the same papermaking procedure as in Example 1, a paper containing the above binder was prepared. As comparative examples, a paper containing no binder, a paper containing the polyamine-epichlorhydrine alone and a paper containing the amphoteric high molecular compound alone were prepared respectively in the same manner as above.

These four types of papers were tested in the same manner as in Example 1, and the results thereof are shown in Table 2.

TABLE 2

| polyamine-epichlorhydrine resin (%) | amphoteric high molecular compound (%) | basis weight (g/m²) | burst factor in dry state | burst factor in wet state |
|---|---|---|---|---|
| — | — | 61.2 | 5.40 | 0.11 |
| 0.5 | — | 62.4 | 6.34 | 1.63 |
| — | 0.5 | 61.8 | 5.50 | 0.15 |
| 0.4 | 0.1 | 61.5 | 6.98 | 2.14 |
| 0.3 | 0.2 | 62.3 | 6.81 | 1.97 |
| 0.2 | 0.3 | 62.5 | 6.31 | 1.69 |
| 0.1 | 0.5 | 62.1 | 5.92 | 0.83 |

EXAMPLE 3

A pulp slurry was prepared by using a bleached sulfate pulp of needle-leaf tree wood ground to the degree of Canadian Standard Freeness 390 cc.

The pulp slurry was used in an amount necessary to give a paper having a basis weight of 60 g/m², and was diluted to 0.5%. By using this pulp slurry, the following four types of papers were prepared in the same manner as in Example 1.

a. A paper having rutile-type titanium oxide dispersed in pulp fiber in an amount of 20% by weight (based on dry pulp weight, hereinafter the same) and containing no binder nor fixer;

b. A paper prepared by adding aluminum sulfate in an amount of 2 – 4% by weight to the above paper (a);

c. A paper prepared by adding the polyamine-epichlorhydrine resin as used in Example 1 to the above paper (a) in an amount of 0.5 – 2.0%; and d. A paper prepared by adding the polyamine-epichlorhydrine resin and amphoteric high molecular compound as used in Example 1 to the above paper (a) respectively in amounts of 0.4 – 1.6% and 0.1 – 0.4%.

The fixing ratio of titanium oxide was measured in accordance with the Ash Method. The results thereof are shown in Table 3.

TABLE 3

| titanium oxide (%) | polyamine-epichlorhydrine resin (%) | amphoteric high molecular compound (%) | aluminium sulfate (%) | basis weight (g/m²) | burst factor in dry state | fixing ratio of titanium oxide (%) |
|---|---|---|---|---|---|---|
| 20 | — | — | — | 60.5 | 3.84 | 5 |
| '' | — | — | 2 | 64.3 | 3.31 | 41.5 |
| '' | — | — | 4 | 65.1 | 3.25 | 45.3 |
| '' | 0.5 | — | — | 64.8 | 3.69 | 43.4 |
| '' | 1.0 | — | — | 65.6 | 3.78 | 49.1 |
| '' | 2.0 | — | — | 66.3 | 3.96 | 54.5 |
| '' | 0.4 | 0.1 | — | 66.7 | 3.89 | 56.4 |
| '' | 0.8 | 0.2 | — | 67.4 | 4.37 | 63.8 |
| '' | 1.6 | 0.4 | — | 68.8 | 4.41 | 74.9 |

EXAMPLE 4

3% kaolin clay slurry (300 ml) was put in a 500 ml-beaker, and an anion-type high molecular compound (mol ratio of acrylamide to acrylic acid = 70 : 30, $\bar{P} = 6 \times 10^4$) was added to the clay slurry in an amount of 40 ppm as an aggregate-forming agent with stirring for 3 minutes. To the resultant mixture, was added 10 ppm of the polyamine-epichlorhydrine resn (as used in Example 1) with stirring for 3 minutes, and then 3 ppm of an amphoteric high molecular compound was further added to the resultant mixture with stirring for 3 minutes.

As comparative samples, a kaolin clay slurry containing the anion-type high molecular compound alone and a kaolin clay slurry containing the anion-type high molecular compound and the polyamine-epichlorhydrine resin were prepared in the same manner as above.

The above prepared three samples were allowed to stand, and their respective supernatant liquids were discarded. Fresh water was supplied to the respective beakers in the same amount as that of the discarded supernatant liquid, and the contents were stirred for 3 minutes. After allowing the slurries to stand, the respective supernatant liquids were discarded in the same manner as above. This procedure was repeated.

While repeating these procedures, the strength of the aggregated structures of the clay was determined by measuring the particle size of the aggregate. The result is shown in Table 4. All the particle sizes are expressed in "mm".

TABLE 4

| | | 40 ppm | 40 ppm | 40 ppm |
|---|---|---|---|---|
| anion-type high molecular compound | | 40 ppm | 40 ppm | 40 ppm |
| polyamine-epichlorhydrine resin | | — | 10 | 10 |
| amphoteric high molecular compound | | — | — | 3 |
| number of times of replacement of supernatant liquid | 0 | 1.5 mm | 1.5 mm | 2.0 mm |
| | 1 | 1.5 | 1.5 | 2.0 |
| | 3 | 1.0 | 1.2 | 2.0 |
| | 5 | 0.1–0.5 | 0.3–0.7 | 2.0 |
| | 10 | 0.01–0.1 | 0.1–0.3 | 1.5–2.0 |
| | 15 | ≦0.05 | ≦0.1 | 1.5–2.0 |
| | 20 | ≦0.01 | ≦0.05 | 1.5–2.0 |
| | 25 | ≦0.01 | ≦0.01 | 1.5–2.0 |
| | 30 | ≦0.01 | ≦0.01 | 1.5–2.0 |

EXAMPLE 5

Rockwool (169 g) and asbestos (7MS-1) (18 g) were placed in a vessel containing water (4500 g), and the contents were stirred for 5 minutes. To the resultant mixture were added tapioca starch (5.6 – 13.1 g) (3 – 7% by weight of rockwool and asbestos) and the polyamine-epichlorhydrine resin as used in Example 1 (1.9 g) (solid weight, 1% by weight of rockwool and asbestos), and the resultant mixture was stirred for 5 minutes. The amphoteric high molecular compound as used in Example 1 (0.29 g) (solid weight, 0.15% by weight of rockwool and asbestos) was finally add to the resultant mixture.

As a comparative sample, a slurry of rockwool and asbestos containing tapioca starch alone was prepared in the same manner as above.

These two types of slurry were respectively placed on a vessel equipped with a wire netting having a length of 26 cm and a width of 20 cm, and water was swished off the vessel to form a wet rockwool plate on the wire netting. The water in the wet rockwool plate was further squeezed off under a pressure of 2 kg/cm² for 3 minutes. The water-squeezed rockwool plate was placed in a metal mould having a length of 26 cm, a width of 20 cm and a thickness of 0.9 cm, and the rockwool plate was pressed between an upper metal plate and a lower metal plate while keeping the thickness of the rockwool plate 0.9 cm. The upper metal plate of the mould had many small holes having a diameter of 0.5 cm so that the water in the rockwool plate could escape through the holes. The rockwool plate in the mould was then dried at 180°C for 2 hours.

The bending strength of the above prepared rockwool plate was measured according to JIS A-5905. The hot water resistance of this plate was evaluated after dipping it in boiling water for 3 minutes. The hot wate resistance was ranked in five grades. Grade 1 means that the rockwool plate was decomposed by hot water and its original shape disappeared. Grades 5 means that the plate was hard enough to keep its original shape without being affected by hot water.

TABLE 5

| Tapioca starch (% by weight of rockwool and asbestos) | Polyamine-epichlorhydrine resin (% by weight of rockwool and asbestos) | Amphoteric high molecular compound (% by weight of rockwool and asbestos) | Bending strength (kg/cm²) | Hot water resistance |
|---|---|---|---|---|
| 3 | — | — | 18.1 | 2 |
| 4 | — | — | 18.7 | 2.5 |
| 5 | — | — | 27.4 | 3 |
| 6 | — | — | 29.4 | 3.5 |
| 7 | — | — | 32.8 | 3.5 |
| 3 | 1 | 0.15 | 18.5 | 4 |
| 4 | 1 | 0.15 | 25.7 | 4 |
| 5 | 1 | 0.15 | 32.5 | 4 |
| 6 | 1 | 0.15 | 36.4 | 5 |
| 7 | 1 | 0.15 | 42.2 | 5 |

EXAMPLE 6

A three-ply wood was prepared by laminating a red lauan board of thickness 0.8 mm on both sides of a core board of the same material of thickness 1.5 mm.

A polyamine-epichlorhydrine resin was prepared in the following manner: Diethylenetriamine (113.5 g), water (72 g) and itaconic acid (130 g) were heated with stirring to 185°C while removing water formed by condensation, and after maintaining this temperature for 40 minutes, 207.5 g of hot water having a temperature of 80°C were added to the reaction mixture to obtain 408 g of polyamide solution having a concentration of 50%. To 83 g of the above prepared polyamide solution, were added water (136.1 g) and epichlorhydrine (34.6 g) with stirring at 60° – 80°C, and the reaction was stopped by cooling when the viscosity of the reaction mixture reached "D" on the Gardner-Holt Scale.

To the above prepared polyamine-epichlorhydrine resn (50 parts), were added commercially available edible wheat flour (10 parts) and an aminocarboxylic acid derivative of polyamide (means degree of polymerization of polyacrylamide, $\bar{P} = 5.5 \times 10^3$; content of vinylamine group = 11%; content of carboxyl group = 25% (10 parts), and the mixture was intimately mixed to obtain a bonding agent.

The ply-wood was prepared by using the above prepared bonding agent in an amount of 250 g/m² on both sides of the core board, pressing the laminated board under a pressure of 10 kg/cm² at room temperature for 15 minutes and then heat-pressing the board under a pressure of 10 kg/cm² at 110°C for 60 seconds.

The bonding strength of the above prepared three-ply wood was measured under various conditions according to the Japan Agriculture and Forestry Standard Method and the Japan Wood Processing Association Method, and the results thereof are shown in Table 6.

Ply-woods prepared by the same procedure as above but using a melamine-urea condensation product and casein respectively were used as comparative examples.

TABLE 6

| Bonding agent | Bonding strength (kg/cm²) | | | Development of formaldehyde (ppm) |
| | at normal state | after dipping in hot water and cold water | after boiling in hot water | |
|---|---|---|---|---|
| Bonding agent of this invention | 14.1 | 11.8 | 9.7 | 0 |
| Melamine-urea condensation product | 14.5 | 13.4 | 9.9 | 20 |
| Casein | 12.6 | peeling off | peeling off | 0 |

EXAMPLE 7

40% vinyl acetate resin emulsion was prepared according to Example 1 of Japanese Pat. No. 591,651 entitled "method for preparing a vinyl acetate-type emulsion".

The polyamine-epichlorhydrine resin and amphoteric high molecular compound used were the same as those used in Example 6.

The following bonding agents (A), (B), (A') and (B') used to make a laminated decorative ply-wood were prepared in the following manner.

Bonding agent (A) was prepared by intimately mixing 30% polyamine-epichlorhydrine resin solution (20 parts) with 40% vinyl acetate resin emulsion (100 parts) at room temperature.

Bonding agent (B) was prepared by intimately mixing 30% titanium sulfate aqueous solution (5 parts) with the above prepared bonding agent (A) at room temperature.

Bonding agent (A') was prepared by intimately mixing the amphoteric high molecular compound (5 parts)

with the above prepared bonding agent (A) at room temperature.

Bonding agent (B') was prepared by intimately mixing 30% titanyl sulfate aqueous solution (2.5 parts) with the above prepared bonding agent (A').

The following Table 7 shows the bonding strength of the laminated decorative ply-wood made by using the above prepared bonding agents under the following bonding condition.

Bonding Condition:
 Material to be laminated:
  Three-ply wood (Type 1) having a thickness of 2.7 mm
  Decorative paper (precoat paper) having a basis weight of 23 g/m².
 Amount of bonding agent used:
  65 – 75 g/m²
 Predrying: aat 100° – 120°C for 30° – 40° second
 Line speed: 40 m/min
 Temperature of press roll: 100° – 120°C
 Number of press rolls: 4
 Press pressure: 5 – 6 kg/cm² of ammonium persulfate (0.12 g) with stirring at 70° – 85°C for 1.5 hours. The reaction product had a concentration of 10.2% and a viscosity of 90 cp (at 30°C).

A resinous composition (100 parts) was prepared by mixing water withh a glyoxal type cellulose-reacting resin (Mirbane Resin SG-838 (trade mark) made by Showa High Polymer Co., Ltd., effective amount = 50%) (12 parts), polyamine-epichlorhydrine resin (4 parts), octadecyl ethylene urea (OCTEX EM (trade mark) made by Hodogaya Chemical Co., Ltd.) (1 part) and a curing agent (Mirbane Fixer K-2 (trade mark) made by Showa High Polymer Co., Ltd.) (2.5 parts).

A rayon cloth (A) was dipped in the above prepared resinous composition. The resinous composition impregnated in the rayon cloth was squeezed to 80%, by weight of dried rayon cloth and a mixture of the above amphoteric high molecular compound (4 parts) and water (96 parts) was sprayed on the rayon cloth. The rayon cloth was then squeezed again in such a manner that the total amount of treating liquid remaining on the rayon cloth became 20% by weight of dried rayon cloth. The treated rayon cloth was pre-dried at 90°C for 3 minutes, and was then further heat-treated at 150°C

TABLE 7

| Bonding agent<br>Test | (A) | (B) | (A') | (B') | 40% vinyl acetate emulsion* | 40% vinyl acetate emulsion/ urea resin** = 100/30 |
|---|---|---|---|---|---|---|
| Flat tensile test (kg/cm²) | 12.7 | 13.9 | 14.5 | 15.6 | 7.0 | 9.5 |
| Second class dipping test | pass | pass | pass | pass | fail | pass |
| Boiling test | no change | no change | no change | no change | peeling off | blistered |
| Degree of damage by cellophane tape test | medium | medium | minimum | minimum | maximum | medium |

*"Polysol No. 5000" (trade mark) made by Showa High Polymer Co., Ltd.
**"Polyfix UC 30-M" (trade mark) made by Showa High Polymer Co., Ltd.

EXAMPLE 8

A polyamine-epichlorhydrine resin was prepared in the following manner: Diethylenetriamine (113.5 g), itaconic acid (65 g), adipic acid (73 g) and water (75.5 g) were heated with stirring to 180° – 200°C while removing water formed by condensation, and after maintaining this temperature for 1.5 hours, 215.5 g of hot water having a temperature of 70°C were added to the reaction mixture to obtain 428.5 g of polyamide aqueous solution having a concentration of 50%. To 116.5 g of the above prepared polyamide solution were added epichlorhydrine (46.8 g) and water (186.7 g) with stirring at 60° – 80°C, and the reaction was stopped by cooling when the viscosity of the reaction mixture reached "E" on the Gardner-Holt Scale.

An amphoteric high molecular compound was prepared in the following manner: Acrylamide (29.5 g) acrylic acid (2.5 g), dimethylaminoethyl-methacrylate (7.9 g) and water (360 g) were reacted in the presence for 3 minutes.

As comparative test samples, a rayon cloth (B) in which the treatment with the amphoteric high molecular compound was omitted in the above procedure; a rayon cloth (C) which was not treated with the amphoteric high molecular compound, but which was treated with a resinous composition containing a modified melamine resin (Mirbane Resin SM-850 (trade mark) made by Showa High Polymer Co., Ltd., effective amount = 80%) in place of the polyamine-epichlorhydrine resin in the above resinous composition; and a rayon cloth (D) which was not treated with the amphoteric high molecular compound, but which was treated with a resinous composition containing a urea type high condensation resin (Mirbane Thermotite (trade mark) made by Showa High Polymer Co., Ltd., effective amount = 50%) in place of the polyamine-epichlorhydrine resin were employed.

Various properties such as crease resistance and the like of the above treated rayon cloths were tested and the results are shown in Table 8.

TABLE 8

| Test | Treating condition Original rayon cloth with no treatment | Rayon cloth (A) treated with the binder of this invention | Rayon cloth (B) treated with polyamine-epichlorhydrine resin alone | Rayon cloth (C) treated with modified melamine resin | Rayon cloth (D) treated with urea resin |
|---|---|---|---|---|---|
| Crease resistance[1] in dry state (angle) (warp + filling) | 189.2 | 241.3 | 224.6 | 224.4 | 225.1 |
| Tear strength[2] (g) (warp + filling) | 1028 | 1406 | 1385 | 1131 | 1028 |
| Wear resistance[3] (times) (warp + filling) | 1299 | 238 | 175 | 134 | 119 |
| Shrinkage[4] % Warp direction | 11.0 | 1.1 | 1.6 | 1.9 | 1.8 |
| Shrinkage[4] % Filling direction | −1.6 | 0.4 | 0.6 | 1.7 | 1.9 |
| Bulky feel | — | excellent | excellent-medium | medium | medium |

[1]Monsant Method
[2]Flmendorf Tear Test
[3]Custom Type Wear Test (tensile load 3 lbs., press load 1.5 lbs.)
[4]JIS - 10420

EXAMPLE 9

A mixture of rayon fiber of 1.5 denier/6 — 10 mm and bleached sulfate pulp (Canadian Standard Freeness - 600 cc) blended in a weight ratio of 80 to 20 was dispersed in water in an amount required to make a paper having a basis weight of 20 g/m², and to obtain a dispersion having a concentration of 1%. To this dispersion, was added and dispersed an acryl resin (Polysol A-704 (trade mark) anion type emulsion made by Showa High Polymer Co., Ltd.) in an amount of 20 – 30% by weight of the fiber. As fixers, (A) aluminium sulfate; (B) the polyamine-epichlorhydrine resin as used in Example 8; and (C) the polyamine-epichlorhydrine resin and amphoteric high polymer compound as used in Example 8 were employed. Fixer (C) works not only as a fixer but also as a binder, and the polyamine-epichlorhydrine resin was first dispersed in the fibers and then the amphoteric high molecular compound was added.

The above prepared materials were made into paper by using a TAPPI Standard Paper Manufacturing Machine, and the paper was dehydrated under a pressure of 3.5 kg/cm² for 5 minutes and air-dried. The air-dried paper was then heat-treated at 110°C for 15 minutes.

The tensile strength of the above prepared paper is shown in Table 9.

TABLE 9

| Polysol A-704 (%) | Fixer | Amount of fixer (% by weight of fiber) | Basis weight (g/cm²) | Tensile strength in dry state (kg/15 mm width) | Tensile strength in wet state (kg/15 mm width) |
|---|---|---|---|---|---|
| 20 | A | 5 | 23.4 | 3.4 | 1.6 |
| 30 | A | 5 | 24.5 | 4.6 | 2.3 |
| 20 | B | 2 | 24.1 | 4.3 | 2.1 |
| 30 | B | 3 | 25.3 | 5.1 | 2.8 |
| 20 | C | 2–0.4 | 24.2 | 6.4 | 3.9 |
| 30 | C | 3–0.6 | 25.6 | 7.8 | 4.8 |

What we claim is:

1. A binder combination comprising (a) 20 – 99 parts by weight of primary binder of a polyamine-epichlorhydrin resin obtained by reacting epichlorhydrin with a polyamine resin having at least 2 groups selected from the group consisting of primary, secondary, tertiary amino and quaternary ammonium, and at least one of which is primary, secondary or tertiary amino, in an amount of 0.5 – 2.5 equivalents per amino group; and (b) 1 – 80 parts by weight of secondary binder which is an amphoteric, polymeric high molecular weight compound having at least 2 cationic groups, selected from the group consisting of primary, secondary, tertiary amino and quaternary ammonium, at least one of which is primary, secondary or tertiary amino, and at least 2 anionic groups selected from the group consisting of carboxyl and sulfone, said cationic and anionic groups in said amphoteric compound compound being on a single polymer.

2. A binder according to claim 1 wherein the secondary binder is selected from the group consisting of aminocarboxylic acid derivatives of polyacrylamide; an acrylic acid ester-acrylic acid copolymer modified by an amino group-containing compound; an acrylamide-polymerizable monobasic or dibasic acid-dimethylaminoethylmethacrylate copolymer; a polymerizable monobasic or dibasic acid-dialkylaminoethylmethacrylate copolymer; a vinylamineacrylamide-acrylic acid copolymer; a polyethylene-imine containing a carboxyl group and aminosulfonic acid derivatives of polyacrylamide.

3. A binder combination according to claim 1, wherein the polyamine resin is a polyethylene-imine or a polyalkylene-polyamine.

4. A binder combination according to claim 1, wherein the polyamine resin is a polyamide-polyamine obtained by reacting an alkylenediamine or polyalkylene-polyamine with a saturated or unsaturated dibasic carboxylic acid or its ester.

5. A binder combination according to claim 1, wherein the polyamine resin is a polyamide-polyamine obtained by the reaction of three components, an alkylenediamine, epichlorhydrine and a saturated or unsaturated dibasic carboxylic acid or its ester.

6. A binder combination according to claim 1, wherein the polyamide-polyamine is one modified with urea, ethylene oxide, formalin or a vinyl compound.

* * * * *